United States Patent

Ray et al.

Patent Number: 6,023,588
Date of Patent: Feb. 8, 2000

[54] METHOD AND APPARATUS FOR CAPTURING PANORAMIC IMAGES WITH RANGE DATA

[75] Inventors: Lawrence A. Ray; Carl N. Schauffele, both of Rochester; Brett VanSprewenburg, Henrietta, all of N.Y.

[73] Assignee: Eastman Kodak Company, Rochester, N.Y.

[21] Appl. No.: 09/162,310

[22] Filed: Sep. 28, 1998

[51] Int. Cl.[7] .................................................. G03B 17/24
[52] U.S. Cl. ............................ 396/20; 396/322; 396/325
[58] Field of Search ................................ 396/20, 24, 21, 396/322, 324, 325, 419, 428, 429

[56] References Cited

U.S. PATENT DOCUMENTS

| | | |
|---|---|---|
| 3,635,140 | 1/1972 | Wolf . |
| 4,290,083 | 9/1981 | Collender . |
| 4,429,328 | 1/1984 | Jones, Jr. et al. . |
| 4,999,713 | 3/1991 | Ueno et al. . |
| 5,008,543 | 4/1991 | Bertrand et al. ............................ 356/1 |
| 5,097,325 | 3/1992 | Dill . |
| 5,262,852 | 11/1993 | Eouzan et al. . |
| 5,396,583 | 3/1995 | Chen et al. . |
| 5,497,188 | 3/1996 | Kaye . |
| 5,539,483 | 7/1996 | Nalwa . |
| 5,650,813 | 7/1997 | Gilblom et al. . |
| 5,659,804 | 8/1997 | Keller . |
| 5,666,459 | 9/1997 | Ohta et al. . |

OTHER PUBLICATIONS

Sidney F. Ray, Applied Photographic Optics: Lenses and Optical Systems for Photography, Film, Video, and Electronic Imaging, *The Bath Press,* Avon, England, 1994, p. 42.

H. C. Huang & Y. P. Hung, Panoramic Stereo Imaging System with Automatic Disparity Warping and Seaming, *Graphical Models and Image Processing,* vol. 60, No. 3, May 1998, pp. 196–208.

Y. Ohta & T. Kanade, Stereo by Intra–and Inter–Scanline Search Using Dynamic Programming, *IEEE Transactions on Pattern Analysis and Machine Intelligence,* vol. PAMI–7, No. 2, Mar. 1985, pp. 139–154.

*Primary Examiner*—David M. Gray
*Attorney, Agent, or Firm*—Thomas H. Close

[57] ABSTRACT

A technique of capturing a stereoscopic panoramic photographic image of a scene, includes capturing a first 360° panoramic image of a scene from a first point on a vertical axis; and capturing a second 360° panoramic image of the scene from a second point on the vertical axis, the second point being displaced from the first point by a stereoscopic baseline distance.

10 Claims, 6 Drawing Sheets

METHOD AND APPARATUS FOR CAPTURING PANORAMIC IMAGES WITH RANGE DATA

FIELD OF THE INVENTION

The present invention is in the field of image capture, and in particular capturing panoramic images with range data.

BACKGROUND OF THE INVENTION

There is a growing number of imaging applications where the viewer has the perception of being able to move about a virtual environment. One method of developing such a virtual environment is to capture a plurality of images, which can be combined into 360° panoramic view. Panoramic images can be considered as capturing an image as if the film were wrapped in a cylinder. For applications such as virtual reality, a portion of the image is transformed to appear as if the image were captured with a standard photographic system. However, since optical systems are not easily built which capture images on cylindrical photoreceptors, a variety of methods have been developed to provide the functionality.

A direct means for capturing panoramic images, uses a rotating vertical slit camera, such as the Roundshot and Cirkut Camera. Such a camera captures the panoramic image by exposing film through a slit and then rotating the camera while moving the slit to expose a panoramic image on the film. These systems are rather expensive, and are not commonly used. IPIX and BeHere capture panoramic images with mirrors using standard photographic film. The advantage of these systems is that it captures the entire image at one instance.

Another means for accomplishing this task is to have multiple cameras which are synchronized and calibrated in order to perform the splicing to form the panoramic view without resorting to rotating a camera for individual images. Such a system was developed by Vishvjit Nalwa (see U. S. Pat. No. 5,539,483, "Panoramic Projection Apparatus," issued Jul. 23, 1996). This system uses several cameras and permits the simultaneous capture of a panoramic image.

Recently another method has been developed where a camera system is mounted on a pivoting tripod and the camera is incrementally rotated and individual images are captured. Then the images are digitized and spliced into a continuous 360° panorama (see S. E. Chen and G. S. P Miller, "Cylindrical to planar image mapping using scanline coherence," U.S. Pat. No. 5,396,583, issued Mar. 7, 1995). This approach is used by the software application known as "Photo Vista" sold by Live Picture, Inc. Portions of the panoramic images are shown to the viewer in such a manner as to give the perception of moving about the virtual environment.

One feature of rotating a camera systems is that the position of the axis of rotation is at the rear nodal point of the camera's optical system. This is well-known (see S. Ray, *Applied Photographic Optics, Lenses and Optical Systems for Photography, Film, Video and Electronic Imaging,* The Bath Press, Avon, England, 1994, p. 42) and is highly desirable for any panoramic system.

The position of the rear nodal point in the camera optics is used in the design of conventional panoramic camera mounts. Such a design is included in the DC-220VR camera kit produced by Eastman Kodak Company, which may be used with the DC-220 camera to capture panoramic images. The system also locks the camera to proper position to eliminate misalignment which might occur with a conventional camera mount system. Positioning the rear nodal point on the axis of rotation assures that the best possible results are obtained.

Because conventional panoramic images do not have range associated with the objects in the scene there are many potential applications of virtual-reality which are not accomplished easily. One such application is the ability to introduce objects synthetically into a panoramic image and interact with the image as one might like. For instance, if the objects are a distance d from the camera and a synthetic object is desired to be placed midway and have the zooming property of virtual images to operate in a manner appearing normal, the range must be known. Also, if synthetic objects are to interact with real objects in the image, the range information is critical.

Applying panoramic images for virtual reality is very attractive as it is easily implemented and offers a means of providing high quality images in a real-time imaging system. However, since the panoramic image capture systems do not acquire images from different vantage points, it is unreasonable to expect the system to estimate the range of the objects to the image capture point. Estimating range information can be accomplished in many ways, though a common and well-known method is stereo image pairs.

Conventionally, stereo images are captured using two optical systems having parallel optical axis. The plane formed by the optical axis and vector between image centers being parallel to the ground. The reason for this is that stereo images are typically used to give the viewer a perception of three-dimensionality, and the human visual system has this arrangement. There have been systems producing stereo panoramic images, (see Huang and Hung, *Panoramic Stereo Imaging System with Automatic Disparity Warping and Seaming, Graphical Models and Image Processing,* Vol. 60, No. 3, May, 1998, pp. 196–208), however, this system uses a classical side-by-side stereo system as the intent is to utilize the stereo images for a human viewer, and not to estimate the depth of objects. One problem of the side-by-side approach is that panoramic images are best captured when the axis of rotation is at the rear-nodal point of the optical system. In a conventional side-by-side configuration this is geometrically impossible. As a result, at least one of the panoramic images is sub-optimal.

The ability to estimate range from a pair of stereo images is well known and references to this can be found in many standard textbooks.

Difficulties with stereo imaging are in matching corresponding image points in two images. Another problem is that the range estimates are partially based upon the disparity, or distance between the focal points of the two cameras. For a classical stereo system the problem of the disparity is that better depth estimates can be attained when the disparity increases, but as the disparity increases the number of image points in correspondence decreases, which diminishes the value of the system. A general "rule-of-thumb" is that the disparity should be at least $\frac{1}{10}$ of the range to be estimated. Hence if an object is in the far field, a wider disparity is preferable. The need for a large disparity aggravates the problem noted above. There is a need therefore for an improved stereoscopic panoramic photographic method and apparatus.

SUMMARY OF THE INVENTION

The problem is solved according to the present invention by providing a method and apparatus for capturing a panoramic image of a scene with range data, including capturing a first 360° panoramic image of a scene from a first point on a vertical axis; and capturing a second 360° panoramic image of the scene from a second point on the vertical axis, the second point being displaced from the first point by a stereoscopic baseline distance.

Advantages

The present invention is advantageous in that the disparity (distance between the first and second images) can be adjusted at will, depending upon the application without affecting the quality of the resulting stereoscopic image.

DETAILED DESCRIPTION OF THE INVENTION

The present invention provides a means of capturing and processing of stereo panoramic images in order to take advantage of the strengths of panoramic images as well as permit the determination of relative depth for points within the panoramic images. This extends the use of panoramic images for purposes such as virtual reality, by allowing for the composite of several images in a natural fashion.

Figure 1:
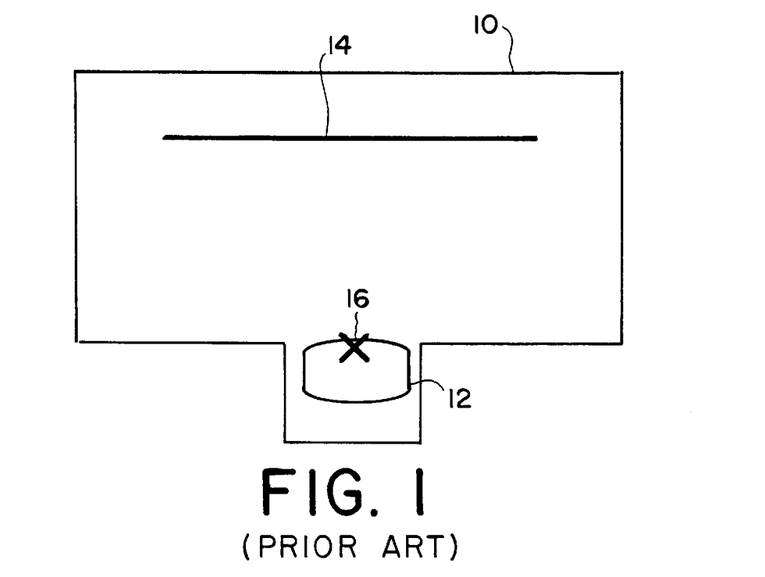
FIG. 1 (prior art) is a schematic top view of a prior art 360° panoramic camera employed with the present invention.

Referring to FIG. 1, a 360° panoramic camera 10 used with the present invention is shown. The camera 10 includes a taking lens 12, an image capture plane 14, where an image capture medium such as conventional silver halide photographic film, or an electronic image sensor is located. The taking lens 12 has a rear nodal point 16. In such a 360° panoramic camera, the camera body, the lens, or a mirror (not shown) is rotated about the rear nodal point 16 of the lens 12 to expose a panoramic image of a scene onto the image capture medium. Examples of such cameras can be found in U.S. Pat. No. 5,659,804 issued Aug. 19, 1997, to Keller; and U.S. Pat. No. 5,650,813 issued Jul. 22, 1997, to Gilblom et al.; or in the Roundshot 220VR brand camera from Seitz Phototechnik AG, Germany.

As was described above, the conventional camera arrangement for stereo imaging is for two cameras to be offset in the horizontal direction perpendicular to the focal axes of both cameras. The distance between the two cameras is commonly referred to as the disparity. With this arrangement the corresponding points in the two images can be found on the same line in the image. For a digital system this implies that a corresponding point in the same scan line, though the position within the scan line of each image will differ depending upon the distance of the associated object from the cameras. According to the present invention, this is achieved by capturing stereo image pairs that are displaced from each other along a vertical axis through the rear nodal point of a taking lens, rather than being displaced along a horizontal axis as in the conventional stereo image capture systems. This configuration recovers the advantage of the conventional stereo capture configuration, in that points in one image of the stereo pair have their corresponding point in the other image of the pair along a vertical line, which simplifies the correspondence problem.

Figure 2:
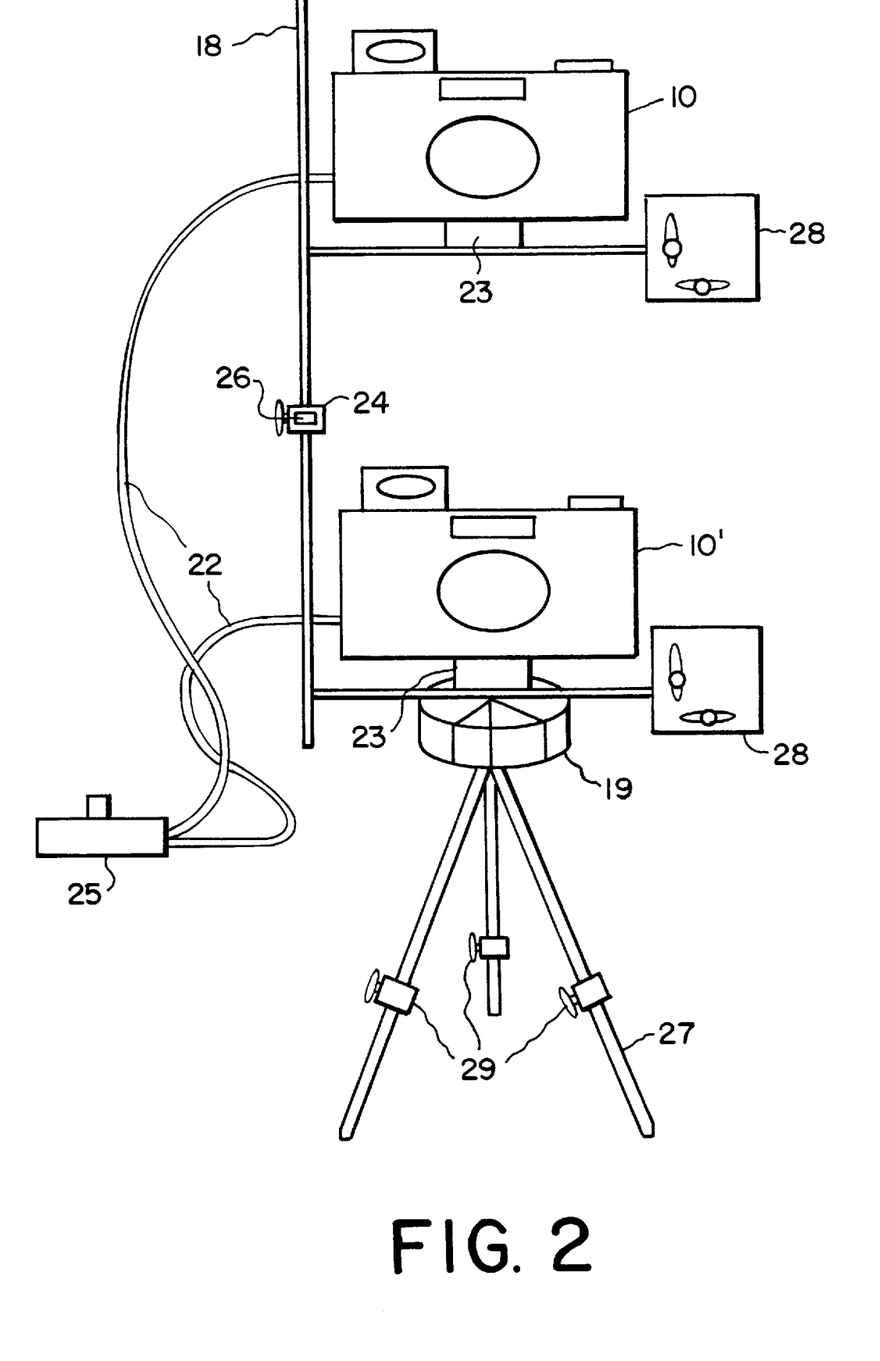
FIG. 2 is perspective diagram of a 360° panoramic stereoscopic image capture apparatus according to the present invention.

Referring now to FIG. 2, a preferred embodiment of apparatus employed to capture a collection of stereo images to produce a 360° panoramic image with range data will be described. A pair of 360° stereoscopic cameras 10 and 10' are mounted on a rotating camera support for rotation about the respective rear nodal points 16 (see FIG. 1) of the cameras. The rotating camera support includes a support rod 18 that is mounted for rotation in a base 19. The operator rotates the camera assembly after each photograph in the series. The rotation angle is sufficiently small to permit adequate overlap between successive images for the subsequent "image stitching." An angle of 30° is generally adequate, but the amount of rotation is dependent upon the field of view of the camera system. A motorized system can also be conceived, but this system performs an equivalent task. The cameras 10 and 10' are vertically displaced from each other along the rotating camera support rod 18 to provide a disparity, d.

The cameras 10, 10' are assumed to be identical and share in the same optical specifications, e.g., focal length and field of view. The disparity d of the two cameras 10, 10' directly influences the resolution of depth estimates for each point in the 360° panoramic image. This is a well-known problem in the capture of stereo image in a conventional system. The amount of disparity is a function of the expected distance from the camera to the objects of interest. The same situation occurs here, but with a vertical disparity instead. To permit this the camera system has an adjustable vertical disparity mechanism 24, such as an adjustable rack and pinion on the rotating camera support rod 18. The amount of vertical disparity is displayed on a vernier gauge 26 on the support rod 18. The displacement distance d must be noted and employed in accurately estimating the distance from the cameras to the objects.

Each camera 10, 10' has an optical axis, and alignment between the two cameras must assure that the two optical axes are as parallel as possible. The reason for this is that the correspondence of points is based upon this assumption, and deviation from this will result in either points being classified as not having a corresponding point (i.e., an occluded point) or an inaccurate depth estimate. The camera support 18 is designed to be sufficiently sturdy to maintain the alignment of the two cameras. It is also designed to minimize any non-vertical displacement and is made sufficiently stiff to accomplish this task. The cameras must also be mounted such that they share the same rotational angle. In order to keep the cameras in vertical alignment a set of level indicators 28 are mounted on the support mechanism. The camera mounts 23 lock a camera to eliminate any side-to-side rotation creating misalignment between the two cameras. The base 27 is like a common camera tripod and the lengths of the three legs are adjustable, each with a locking mechanism 29. By using the locking mechanism 29 and the level indicators 28 the operator can align the cameras to be displaced solely in the vertical direction.

In order to activate the cameras, a remote shutter control 25 is used which triggers both cameras simultaneously. The cameras are connected to the shutter control by a pair of wires 22 or by an RF control signal. Activating the remote-shutter-control is done via pressing a simple button.

Figure 3:
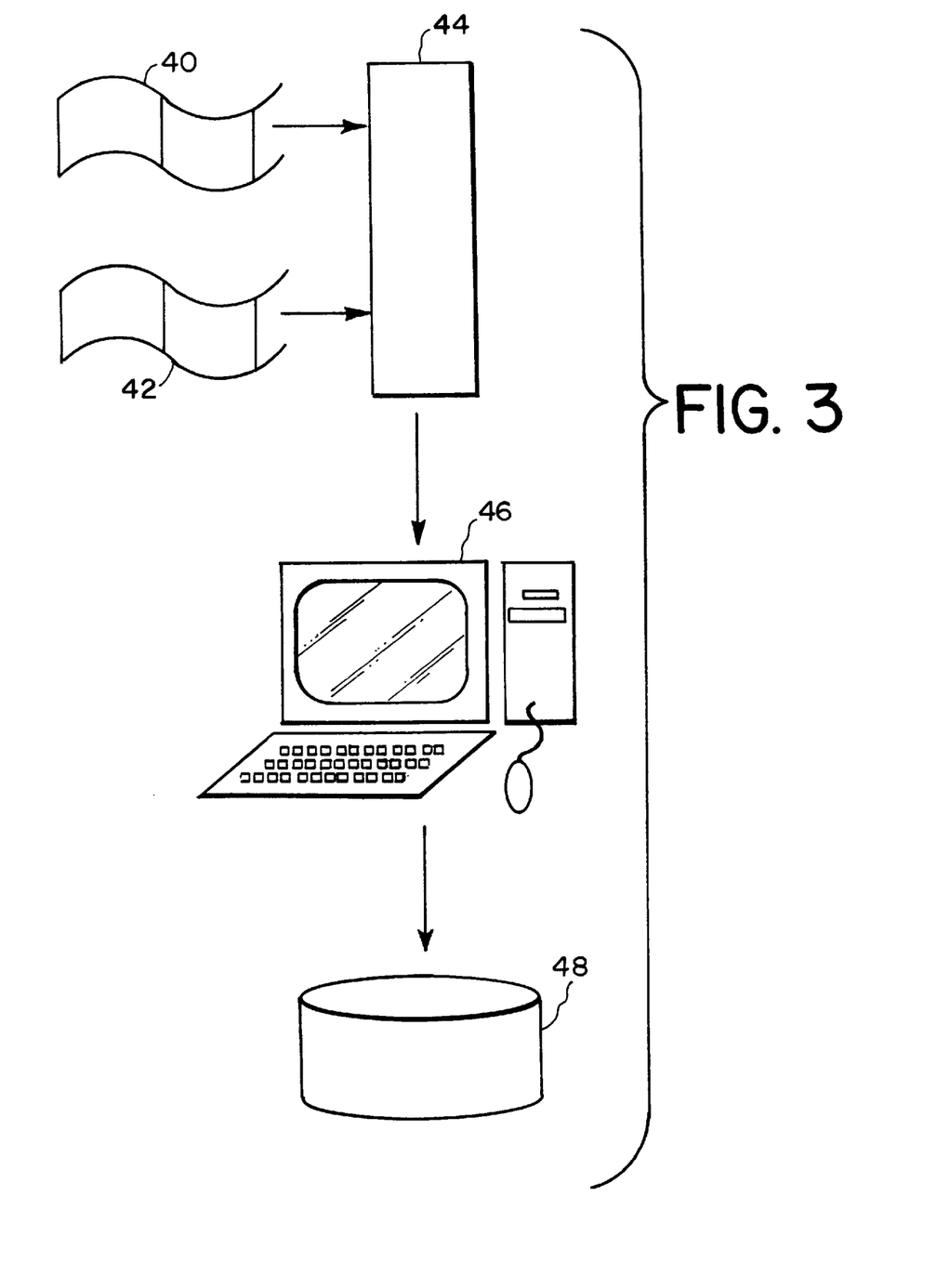
FIG. 3 is schematic block diagram showing an image processing system employed to extract depth information from the images captured by the apparatus shown in FIG. 2.

Referring to FIG. 3, once the images are captured they are stored either on film or as digital files within a camera. Each camera 10 and 10' has its record of images 40 and 42. These images have to be prepared for additional processing. In the case of images captured on film, the film has to be developed and sent through a digitization processor 44 and the images captured as vertical pairs need to be associated. In the case of digital images, the processor 44 does not digitize the images, but rather it retrieves the images from the respective cameras and then associates vertical pairs. The series of vertical pairs are then entered into an image processing computer 46 where the range is estimated and the images are stitched to form a panoramic image. The resultant panoramic image with range information is then stored into a mass storage device 48 for future use.

Figure 4:
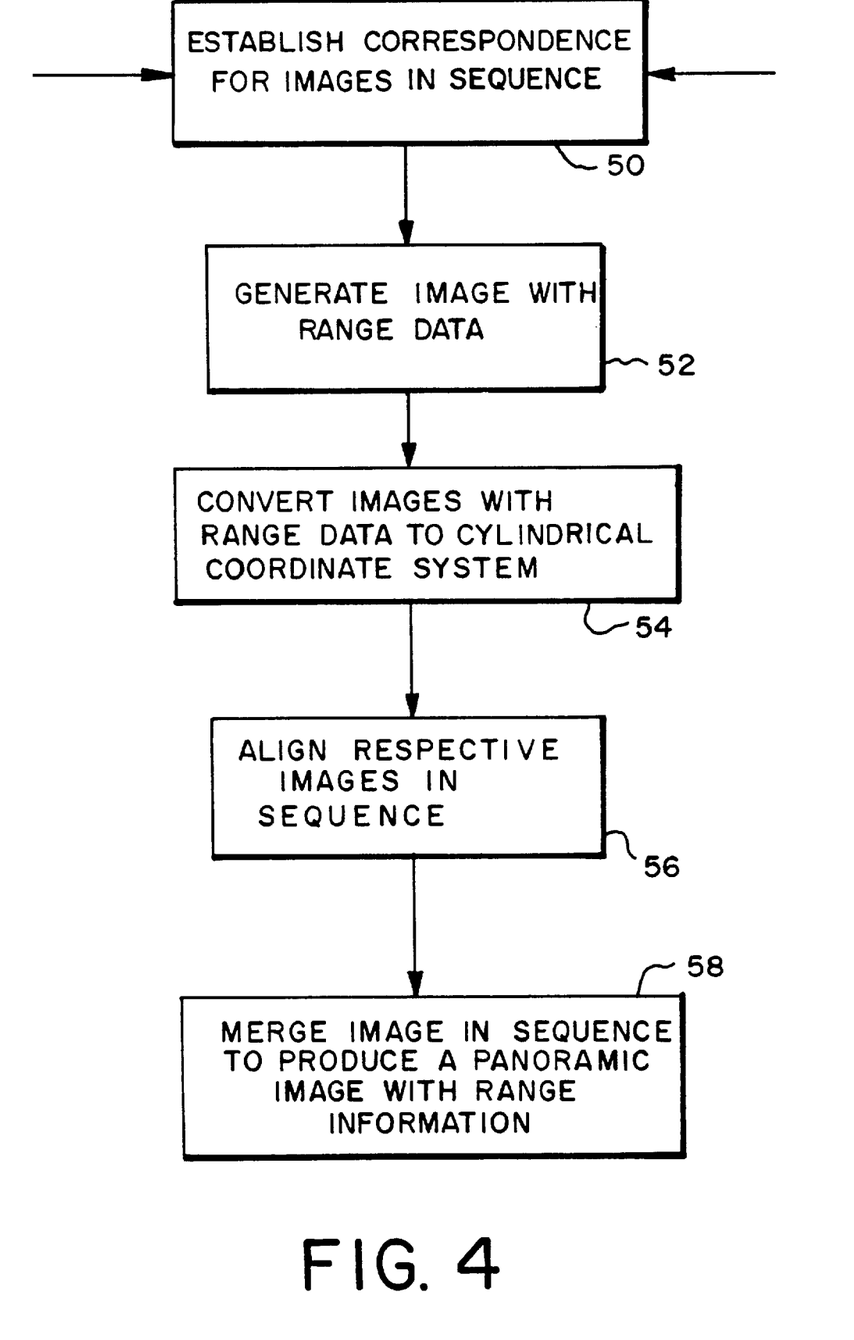
FIG. 4 is a diagram showing the data-flow path for images to produce a panoramic image with depth information.

Referring to FIG. 4, the operations within the image-processing computer 46 are elaborated. For each vertically associated image pair pixel-to-pixel correspondences between the images are determined 50. Because the cameras are vertically displaced, given a pixel within one image, the corresponding pixel will share the pixel column in the second image. Thus, given a pixel at location (x,y) in the first image, the corresponding pixel in the second image will have the same x-coordinate. Of course, the corresponding pixel might not exist in the second image for one of several reasons. There is a long history of algorithms which address the correspondence problem (see for example, Y. Ohta and T. Kanade, *Stereo by Intra- and Inter-Scanline Search Using Dynamic Programming, IEEE Transactions on Pattern Analysis and Machine Intelligence*, Vol. PAMI-7, No. 2, March, 1985, pp. 139–154). Once the correspondence between pixels has been established, a preliminary range estimate is computed 52 by taking the absolute difference in the y-coordinates of the corresponding pixels. At this point the lower images can be dispensed with the remaining upper images with range information are retained. The images are planar images and need to be converted to cylindrical coordinates along with the range estimates. This is accomplished in operation 54, which is elaborated upon below. The cylindrical images are aligned 56 to maximize the amount of overlap between successive images. The series of aligned images are merged into a large panoramic image 58. This method is elaborated below.

Figure 5:
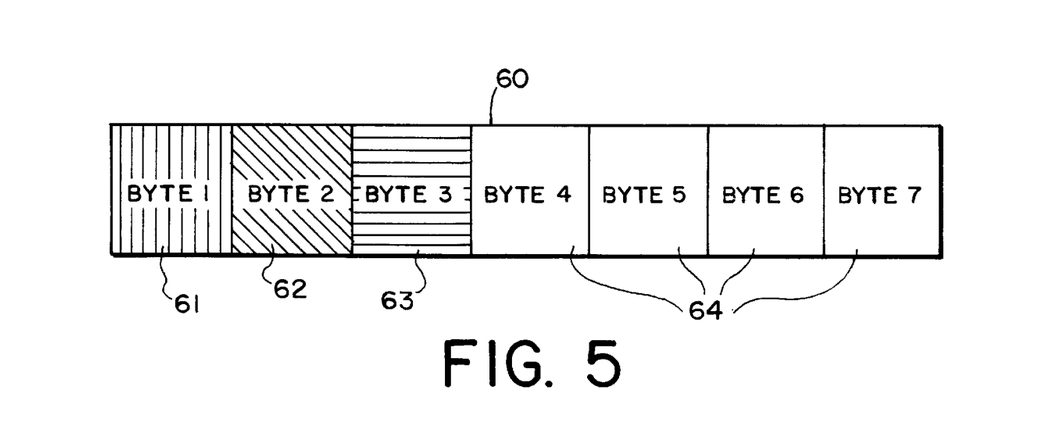
FIG. 5 is a diagram showing the augmented pixel used by the output panoramic image and range information.

Referring to FIG. 5, the image and range data 60 are stored in a data structure as follows. Typically digital images are stored with each pixel having a data structure of three bytes. In the present invention this structure is augmented by the addition of range data. As a result, the first byte 61 represents the red signal, the second byte 62 is the green signal, and the third byte 63 is the blue signal. The range data 64 can be stored in a multitude of formats, however, the preferred method is for a floating point number. Alternatively, an integer value can also be used, being strictly the absolute difference in the y-coordinates as described earlier.

Figure 6:
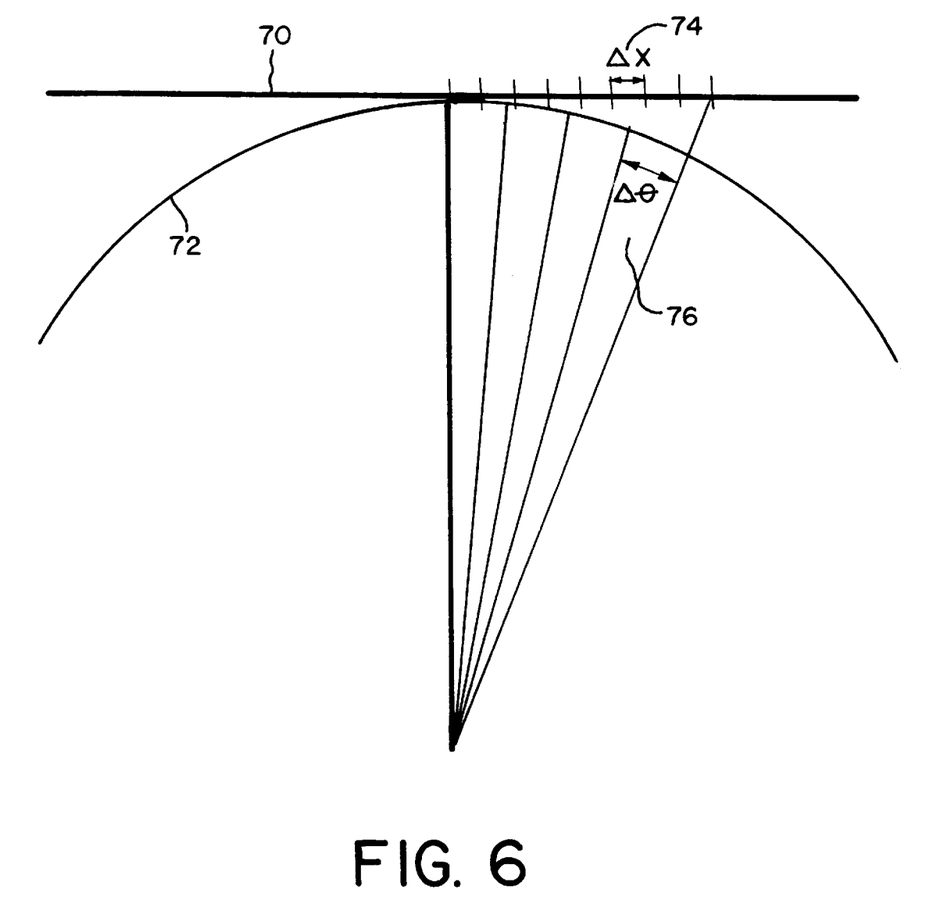
FIG. 6 is a schematic diagram useful in describing the planar to cylindrical image transformation.

Referring to FIG. 6: As previously stated, a transformation of image data from planar coordinates to cylindrical coordinates occurs at step 54 in FIG. 4. This is necessary because panoramic images are formed by constant angular increments, while standard images are constant linear increments. Consider a horizontal line along an image 70. Pixels are spaced with a standard increment 74 denoted $\Delta x$, and there are n pixels in a scanline of an image. The panoramic image 72 is a cylinder with constant angular increments 76 denoted $\Delta \theta$. Let $2\theta$ be the field of view of the camera system. In order to establish the algorithm to transform a scanline of an image to the cylindrical coordinates, the following geometric relationships need to be defined. The cylindrical pixel coordinates are indexed in such a manner that the pixel indexed as zero is on the parallel to the optical axis, i.e., perpendicular to the image plane. The position of the mth cylindrical pixel in the image plane, $\rho$, is given by:

$$\rho = \frac{n \Delta x \tan(m \Delta \theta)}{2 \tan(\theta)}$$

Of course the value of $\rho$ is unlikely to be an integer, so for the color information a standard linear interpolation of neighboring pixels is utilized, and the range datum is the smallest of neighboring pixels in the image. Linear interpolation of range data is inappropriate.

In the remaining, the term "pixels" refers to range augmented cylindrical images.

Figure 7:
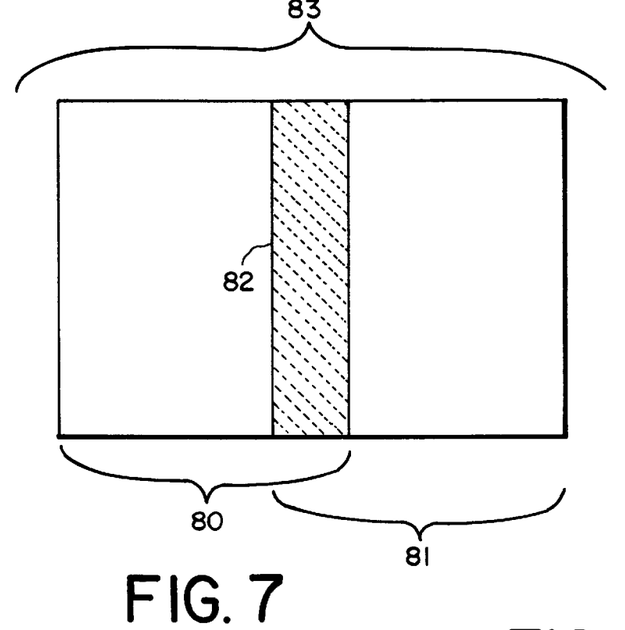
FIG. 7 is a schematic diagram showing of the arrangement of the mages used to construct the panoramic image.

Referring to FIG. 7, successive images 80 and 81 are aligned by selecting the right-most n columns of the left image 80 and the left-most columns of the right image 81 and calculating the correlation between the two regions. The largest correlation that results from the process determines the region of overlap 82. A combined image 83 is then formed as follows. Let k be the last column of the left image 80 not part of the overlap, and let j be the first column of the right image not part of the overlap. The new image 83 is formed by scanning in each row, the first k pixels of the left image 80, all pixels of the overlap 82 and then the pixels after and including the jth pixel in the right image 81. This step is repeated for each row until the entire image is complete.

Figure 8:
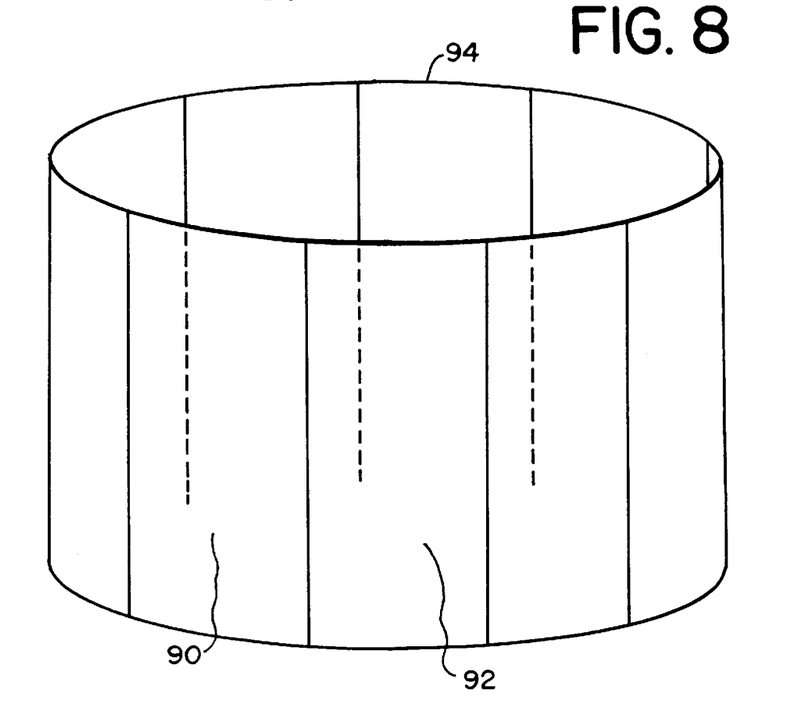
FIG. 8 is a schematic diagram showing the relationship between successive images to the panoramic image.

Referring to FIG. 8 the process of alignment for the first n images continues and finally the last image 92 overlaps with the first image 90. The process described in the previous paragraph is continued, except the left image is now the right image. In an iterative fashion the correlation of the right-most n columns of the image and the left-most n columns of the image is determined until a maximum correlation occurs. If the maximum correlation is obtained with m columns, then the panoramic image 94 is formed by eliminating the final m columns from each scanline in image 90.

The invention has been described in detail with particular reference to certain preferred embodiments thereof, but it will be understood that variations and modifications can be effected within the spirit and scope of the invention.

| PARTS LIST | |
|---|---|
| 10 | panoramic camera |
| 10' | camera |
| 12 | taking lens |
| 14 | image capture plane |
| 16 | nodal point |
| 18 | support rod |
| 19 | base |
| 22 | pair of wires |
| 23 | camera mounts |
| 24 | disparity mechanism |
| 25 | shutter control |
| 27 | base |

-continued

PARTS LIST

| | |
|---|---|
| 28 | level indicators |
| 29 | locking mechanism |
| 40 | record of images |
| 42 | record of images |
| 44 | processor |
| 46 | processing computer |
| 48 | storage device |
| 50 | determine correspondences between images |
| 52 | compute range estimate |
| 54 | convert images |
| 56 | align images |
| 58 | panoramic image |
| 60 | range data |
| 61 | first byte |
| 62 | second byte |
| 63 | third byte |
| 64 | range data |
| 70 | image |
| 72 | panoramic image |
| 74 | standard increment |
| 76 | angular increments |
| 80 | left image |
| 81 | right image |
| 82 | overlap |
| 83 | combined image |
| 90 | first image |
| 92 | last image |
| 94 | panoramic image |

What is claimed is:

1. A stereoscopic panoramic photographic method, comprising the steps of:
   a) capturing a first 360° panoramic image of a scene from a first point on a vertical axis; and
   b) capturing a second 360° panoramic image of the scene from a second point on the vertical axis, the second point being displaced from the first point by a stereoscopic baseline distance.

2. The stereoscopic panoramic photographic method of claim 1, further comprising the steps of:
   c) deriving range data from the first and second 360° panoramic images; and
   d) storing the first 360° panoramic image with the range data.

3. The stereoscopic panoramic photographic method of claim 2, wherein the images are color images.

4. Apparatus for capturing a stereoscopic panoramic photographic image of a scene, comprising:
   a) means for capturing a first 360° panoramic image of a scene from a first point on a vertical axis; and
   b) means for capturing a second 360° panoramic image of the scene from a second point on the vertical axis, the second point being displaced from the first point by a stereoscopic baseline distance.

5. The apparatus claimed in claim 4, wherein the means for capturing the first and second 360° panoramic images comprise first and second 360° panoramic cameras.

6. The apparatus claimed in claim 4, wherein the means for capturing the first and second 360° panoramic images comprise a 360° panoramic camera and means for translating the camera along the vertical axis between first and second 360° exposures.

7. The apparatus claimed in claim 5, wherein the cameras are silver halide film cameras.

8. The apparatus claimed in claim 5, wherein the cameras are electronic cameras.

9. The apparatus claimed in claim 6, wherein the camera is a silver halide film camera.

10. The apparatus claimed in claim 6, wherein the camera is an electronic camera.

* * * * *